United States Patent
Grannan

(10) Patent No.: US 9,681,495 B2
(45) Date of Patent: *Jun. 13, 2017

(54) METHOD FOR SCANNING SERVICES WITH A MULTIMODE COMMUNICATION DEVICE

(71) Applicant: AT&T INTELLECTUAL PROPERTY I, LP, Atlanta, GA (US)

(72) Inventor: Michael Grannan, Parker, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,653

(22) Filed: Mar. 18, 2016

(65) Prior Publication Data

US 2016/0205619 A1    Jul. 14, 2016

Related U.S. Application Data

(63) Continuation of application No. 13/489,576, filed on Jun. 6, 2012, now Pat. No. 9,326,318, which is a continuation of application No. 11/296,955, filed on Dec. 8, 2005, now Pat. No. 8,213,922.

(51) Int. Cl.
| | |
|---|---|
| *H04M 3/00* | (2006.01) |
| *H04W 88/06* | (2009.01) |
| *H04W 48/16* | (2009.01) |

(52) U.S. Cl.
CPC .......... *H04W 88/06* (2013.01); *H04W 48/16* (2013.01)

(58) Field of Classification Search
None
See application file for complete search history.

(56) References Cited

U.S. PATENT DOCUMENTS

| | | |
|---|---|---|
| 6,914,950 B1 | 7/2005 | Luneau |
| 6,937,877 B2 | 8/2005 | Davenport |
| 7,441,043 B1 | 10/2008 | Henry |
| 2002/0039892 A1 | 4/2002 | Lindell |
| 2002/0101858 A1 | 8/2002 | Stuart |
| 2003/0078037 A1 | 4/2003 | Auckland |
| 2003/0093159 A1 | 5/2003 | Sieminski |
| 2003/0120583 A1 | 6/2003 | Olson |
| 2004/0018831 A1 | 1/2004 | Majmundar |

(Continued)

FOREIGN PATENT DOCUMENTS

| | | |
|---|---|---|
| CN | 1585541 | 2/2005 |
| DE | 10301499 | 7/2004 |

(Continued)

*Primary Examiner* — German J Viana Di Prisco
(74) *Attorney, Agent, or Firm* — Guntin & Gust, PLC; Ralph Trementozzi

(57) ABSTRACT

A system that incorporates teachings of the subject disclosure may include, for example, a group of preferences of service attributes is established based on a determination of a user behavior. A group is generated of user preferences of the group of preferences of service attributes according to a user profile. First and second service attributes from the group of preferences of service attributes are adjusted for each service according to the group of user preferences to achieve a desired balance of service offerings. Available services are identified operating in the television spectrum, and one of the services operating is selected responsive to the adjusting of the first and second service attributes according to the group of user preferences. Other embodiments are disclosed.

20 Claims, 4 Drawing Sheets

(56) References Cited

U.S. PATENT DOCUMENTS

| | | |
|---|---|---|
| 2004/0203363 A1 | 10/2004 | Carlton |
| 2005/0124339 A1 | 6/2005 | Lau |
| 2006/0036501 A1 | 2/2006 | Shahbazi |
| 2006/0083205 A1 | 4/2006 | Buddhikot |
| 2006/0092865 A1 | 5/2006 | Williams |
| 2006/0130053 A1 | 6/2006 | Buljore |
| 2006/0160543 A1 | 7/2006 | Mashinsky |
| 2007/0004393 A1 | 1/2007 | Forsberg |
| 2007/0091861 A1 | 4/2007 | Gupta |
| 2008/0051099 A1 | 2/2008 | Moore |
| 2008/0298275 A1 | 12/2008 | De Sousa |

FOREIGN PATENT DOCUMENTS

| | | |
|---|---|---|
| EP | 1550331 | 7/2005 |
| WO | 2005/101860 | 10/2005 |

400

METHOD FOR SCANNING SERVICES WITH A MULTIMODE COMMUNICATION DEVICE

CROSS-REFERENCE TO RELATED APPLICATIONS

This application is a continuation of and claims priority to U.S. patent application Ser. No. 13/489,576 filed Jun. 6, 2012, which is a continuation of U.S. patent application Ser. No. 11/296,955 filed Dec. 8, 2005 (now U.S. Pat. No. 8,213,922), the disclosures of each being incorporated herein by reference in its entirety.

FIELD OF THE DISCLOSURE

The present disclosure relates generally to multimode communication devices, and more specifically to a method for scanning services with a multimode communication device.

BACKGROUND

The FCC's (Federal Communications Commission) experience with unlicensed band has proven that providing a "commons" area for spectrum has fostered lots of new consumer devices and services. Technology innovations (e.g. digital spread spectrum technology) have also made it possible for numerous disparate communication devices to co-exist successfully in the same spectrum band.

To spur further advancements in the communications industry, the FCC has proposed that all unused TV spectrum resulting from the transition to HDTV (High Definition TV) be made available to consumer devices and communication service providers on a dynamic basis. The advent of WiFi, WiMAX, Ultra Wideband (UWB), and the ultimate evolution to Software Defined Radio (SDR) technology is expected to drive the need for new applications in multimode communication device that can make use of the proposed unused TV spectrum.

DETAILED DESCRIPTION

Figure 1:
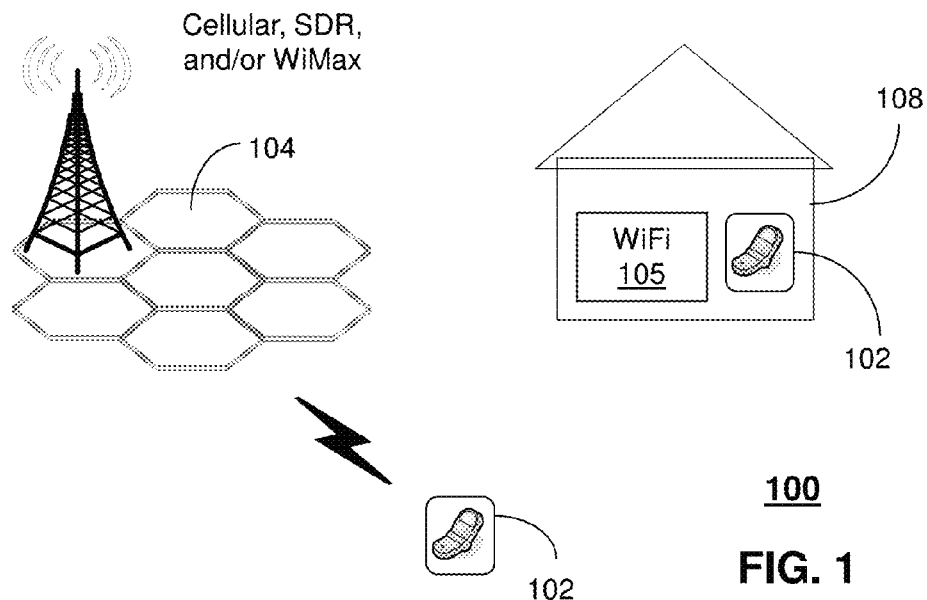
FIG. 1 depicts an exemplary embodiment of a communication device operating in a communication system.

Embodiments in accordance with the present disclosure provide a method for scanning services with a multimode communication device.

One embodiment of the subject disclosure includes a method for receiving on a control channel signaling software for scanning portions of a television spectrum, where the control channel operates in a portion of the television spectrum. The method further includes scanning for services operating in the television spectrum according to the received signaling software, detecting one or more services operating in the television spectrum, and selecting a service of the detected one or more services operating in the television spectrum.

One embodiment of the subject disclosure includes a communication device having a memory storing computer instructions, and a processor coupled to the memory. Responsive to execution of the computer instructions, the processor can perform operations including receiving on a channel signaling software for scanning portions of a television spectrum, where the channel operates in a portion of the television spectrum, scanning for services in the television spectrum according to the received signaling software, detecting one or more services operating in the television spectrum, and selecting one of the detected one or more services according to a service preference.

One embodiment of the subject disclosure includes a computer-readable storage medium having computer instructions which, responsive to being executed by at least one processor, cause the at least one processor to perform operations including receiving a request from a communication device to scan a television spectrum for services, and transmitting to the communication device over a channel of the television spectrum a software defined radio software application to enable the communication device to scan the television spectrum, wherein the channel operates in a portion of the television spectrum.

In a first embodiment of the present disclosure, a communication device has a controller for managing operations of a user interface (UI), and a wireless transceiver. The UI conveys messages to an end user and facilitates manipulating operations of the communication device. The wireless transceiver supports software defined radio (SDR) communications and communications on at least one other access technology. The controller is programmed to scan for services in a television (TV) spectrum and at least one among a cellular spectrum, an ultra wideband (UWB) spectrum, a WiFi spectrum and a WiMax spectrum, detect one or more services on said access technologies, and present one or more of the detected services to the end user.

In a second embodiment of the present disclosure, a computer-readable storage medium operates in communication device. The storage medium has computer instructions for establishing one or more service preferences grouped according to a select one or more end user profiles comprising a stationary end user profile, a mobile end user profile, an economic end user profile, and a data centric end user profile, scanning for services in a TV spectrum and at least one other wireless access technology according to the one or more service preferences, detecting one or more services, and presenting one or more of the detected services to an end user of the communication device.

In a third embodiment of the present disclosure, a base station has a wireless transceiver supporting software defined radio communications in an unlicensed TV spectrum and communications on at least one among a plurality of other access technologies, and a controller for managing operations of the wireless transceiver. The controller is programmed to offer one or more services in the unlicensed TV spectrum and at least one among the plurality of access technologies, receive a service request from a communication device scanning the unlicensed TV spectrum and the plurality of access technologies, and grant the communication device access to the service.

FIG. 1 depicts an exemplary embodiment of a communication device 102 operating in a communication system 100. The communication device 102 in the present illustration represents a multimode communication device capable of communicating with any number of access technologies operating in a base station 104 such as, for example, cellular, software defined radio (SDR) and/or WiMAX technologies, just to mention a few. Cellular technologies can include, for example, CDMA-1x, UMTS/HSDPA, GSM/GPRS, TDMA/EDGE, EV/DO, and next generation technologies as they arise. Alternatively, or in combination, the communication device 102 and the base station 104 can also support WiMAX broadband communications operating at 2.3 GHz, 2.5 GHz, 3.5 GHz, 5.8 GHz, or other frequencies.

The communication device 102 and the base station 104 can also be programmed to perform spectrum analysis utilizing SDR techniques to identify unused portions of spectrum in a local area. The unused spectrum can be represented by portions of TV spectrum expected to be released by the FCC for public use (e.g., 54-72 MHz, 76-88 MHz, 174-216 MHz, 470-806 MHz). Whether or not the FCC releases this spectrum for unlicensed use, it has no impact on the operations of the communication device 102 and base station 104 as described herein. The communication device 102 can also be programmed to access WiFi access points operating at multiple frequencies (e.g., 2.4 GHz or 5.8 GHz). The WiFi access points can be located in a residence or commercial building 108, or be mesh-based to support access across an entire municipality.

Figure 2:
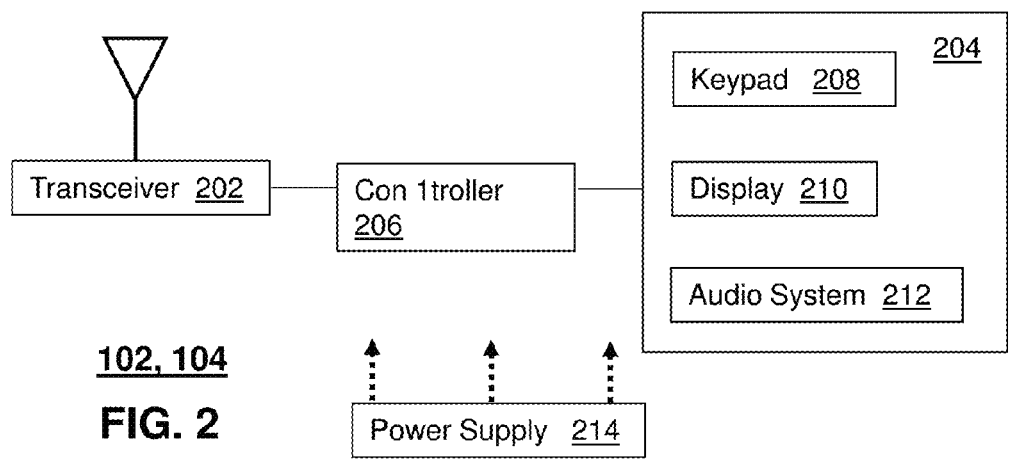
FIG. 2 depicts an exemplary embodiment of the communication device or a base station of the communication system.

FIG. 2 depicts an exemplary embodiment of the communication device 102 or alternatively the base station 104 of the communication system 100. The communication device 104 can comprise a wireless transceiver 202, a user interface (UI) 204, a power supply 214, and a controller 206 for managing operations thereof. The wireless transceiver 202 utilizes common communication technology that supports the aforementioned access technologies (i.e., cellular, SDR, UWB, WiMAX and WiFi). The UI 204 can include a depressible keypad 208 for manipulating operations of the communication device 102. The UI 204 can further include a display 210 such as monochrome or color LCD (Liquid Crystal Display) for conveying images to the end user of the communication device 102. The audio system 212 of the UI 204 utilizes common audio technology for conveying and intercepting audible signals of the end user.

The power supply 214 can utilize common power management technologies (such as replaceable batteries, supply regulation technologies, and charging system technologies) for supplying energy to the components of the communication device 102 to facilitate portable applications. The controller 206 can utilize computing technologies such as a microprocessor and/or digital signal processor (DSP) with associated storage memory such a Flash, ROM, RAM, SRAM, DRAM or other like technologies.

The base station 104 can comprise a wireless transceiver 202, a power supply 214, and a controller 206 for managing operations thereof. The wireless transceiver 202 in this embodiment is generally much larger and more costly than the wireless transceiver of the communication device 102. Generally speaking, base stations utilize large towers (as shown in FIG. 1) for emanating and receiving RF signals from the communication devices 102 according to any one of the aforementioned access technologies. The wireless transceiver 202 further includes a number of computing devices and power amplifiers to support these access technologies across a wide geographic region. The power supply 214 can be a combination of a conventional uninterrupted power supply (UPS) system supported with power from a utility company. The controller 206 can comprise a number of computing devices such as scalable servers with associated nonvolatile (e.g., mass storage media) and volatile memories (e.g., RAM, SRAM, DRAM, etc.).

Figure 3:
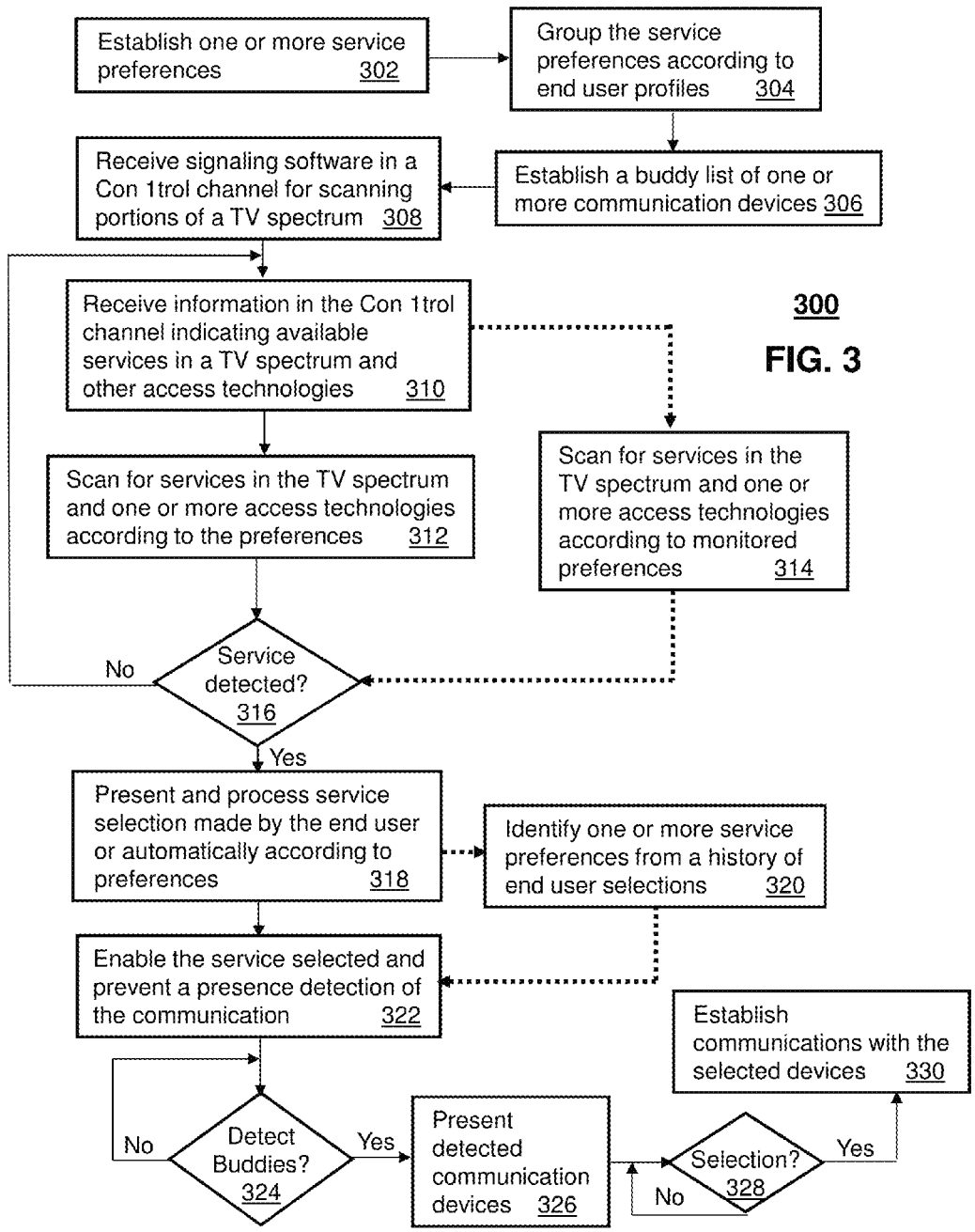
FIG. 3 depicts an exemplary method operating in the communication device.

FIG. 3 depicts an exemplary method 300 operating in the communication device 102. Method 300 begins with step 302 with the controller 206 being programmed to establish one or more service preferences for the end user of the communication device 102. The service preferences can include, for example, cost of service, quality of service (QoS), RF signal strength of a base station 104, communication range of the base station 104 relative to a location of the communication device 102, and hand-off capabilities of neighboring base stations 104. The controller 206 can in turn be programmed in step 304 to group these preferences under the direction of the end user into end user profiles such as a stationary end user profile, a mobile end user profile, an economic end user profile, and a data centric end user profile.

A stationary end user profile can be configured so that the communication device 102 seeks a network having an optimal balance between price and QoS. A mobile profile can configure the communication device 102 so that it seeks networks having the best signal strength, and secondarily the best hand-off capability between base stations 104. The economic end user profile can configure the communication device 102 so that it seeks a communication network having the lowest cost per bit independent of signal strength and range. The data centric end user profile can configure the communication device 102 so that it searches for networks having the highest ratio of Mbps to cost of service. The end user can obviously select other customized parameters for the aforementioned profiles and create other profiles of interest in steps 302-304.

In step 306, the controller 206 can be directed by the end user to also establish a buddy list of other communication devices roaming throughout the communication system 100. The buddy list can include telephone numbers as well as instant messaging (IM) IP addresses to search for these communication devices in any of the aforementioned access technologies. In step 308, the controller 206 can also be programmed to receive signaling software in a control channel for scanning portions of the unlicensed TV spectrum. The signaling software controls the modulation and demodulation technique used for communicating in available bands of the TV spectrum as well as defining the communication protocol for exchanging messages with third party devices. The control channel can be supplied by a portion of the TV spectrum or any of the other access technologies (e.g., cellular). In accordance with SDR techniques, step 308 can be invoked any number of times to reprogram or update the controller 206 to enable a number of communication techniques utilized in the TV spectrum. Step 308 can also be applied to existing and future unlicensed frequencies made available by the FCC.

In step 310, the controller 206 can be programmed to receive information in the control channel indicating the available services in the TV spectrum (or other unlicensed frequency) as well as the other access technologies. This step can serve to accelerate the scanning process as well as inform the controller 206 of the type of signaling technique required to access services in the TV spectrum. The controller 206 can therefrom proceed to step 312 where it scans for the services identified in step 310 in the TV spectrum as well as the other access technologies according to the preferences set forth in steps 302-304. The foregoing services can represent, for example, full-duplex voice services (over circuit switched or packet switched networks using Voice over IP), half-duplex voice services, location services, video services, text messaging services, or instant messaging services, just to mention a few.

If one or more services are detected in step 316, the controller 206 proceeds to step 318; otherwise, it returns to step 310 where it checks for service updates. In step 318, the controller 206 presents the available services to the end user by way of the UI 204 (see FIG. 5), and processes selections made by the end user. For services having security protections (see lock icon next to "Univ. Texas WiMAX"—FIG. 5), the end user may have to enter a security code such as a login and password. Alternatively, the controller 206 can be programmed in step 318 to implicitly select one or more services according to end user profiles configured on the device by the user and/or a history of end user service selections.

In a supplemental embodiment, the controller 206 can be programmed to identify in step 320 service preferences of the end user from a history of monitored behavior. The preferences can be determined from statistical modeling which looks for patterns in the end user's behavior. The controller 206 can alternatively or in combination also monitor network anomalies (e.g., an identified base station 104 with recurring poor signal strength). With end user behavior (e.g. time of day, location) and network anomalies known the controller 206 can further enhance the step of scanning for services in the TV spectrum and other access technologies as depicted step 314.

Once the end user (or a defined profile implicitly) has selected a service, the controller 206 enables in step 322 the selected service, and under direction of the end user can prevent other communication devices from detecting its presence by way of, for example, restrictions provided in the Session Initiation Protocol (SIP). In step 324, the controller 206 can be programmed to monitor and detect other communication devices associated with the buddy list established in step 306. If one or more communication devices are detected, the controller 206 proceeds to step 326 where it presents the end user a list of the communication devices detected. In step 328, the controller 206 awaits a selection from the end user. Upon receiving a selection from the end user corresponding to one or more the detected communication devices, the controller 206 proceeds to step 330 where it establishes communications with said devices.

The aforementioned buddy list communications process of steps 306, and 324-330 can be utilized in instant messaging applications, and/or half-duplex voice applications such as dispatch services commonly referred to as "walkie-talkie" or push-to-talk (PTT) communications.

Figure 4:
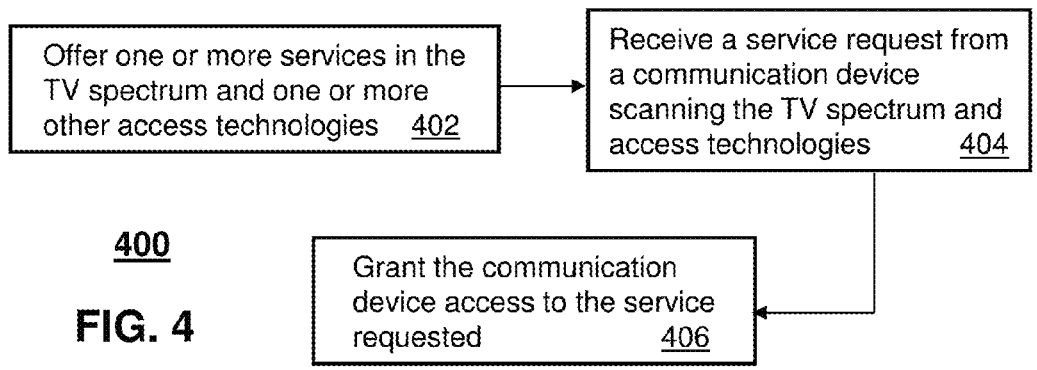
FIG. 4 depicts an exemplary method operating in the base station.

FIG. 4 depicts an exemplary method 400 operating in the base station 104 that in part mirrors the operations of method 300. Method 400 begins with the base station 104 offering one or more services in the TV spectrum and in one or more of the other access technologies discussed earlier. In an SDR environment, the services can be offered dynamically in available licensed or unlicensed spectrum. For example, the FCC may dictate rules in which services may only be offered in the unused TV spectrum for a finite period, and extended the availability of such services only when there are active users. Independent of the bandwidth sharing scheme promulgated by the FCC or public enterprises, a control channel can be provided by the base station 104 (or another communications source) to inform the communication device 102 about these services. The information supplied by the base station 104 can include, for example, a list of available services, a list of services awaiting their turn in queue, a list of SDR techniques used on a per channel basis, sources for downloading SDR software, and so on.

Figure 5:
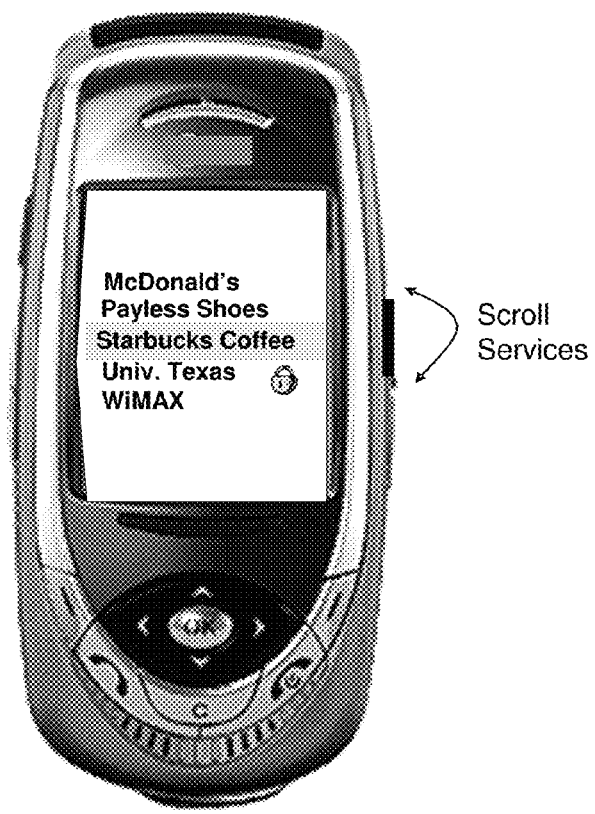
FIG. 5 depicts an exemplary illustration of services presented by the communication device.

In step 404, the base station 104 can be programmed to receive a service request from a communication device 102 scanning the TV spectrum or one of the other access technologies. The service request can be processed at the base station 104 or at a controller managed by a third party enterprise offering the service. For example, the communication device 102 of FIG. 5 illustrates Starbucks Coffee highlighted in the display 210 as one of the potential sources of service available to the end user. The service can be hosted by the Starbucks Coffee Company in which case, the base station 104 relays the service request to the controller hosting said service. The service request may or may not require subscription and security information (e.g., login and password) depending on the service requirements of the hosting party. However, in most cases this can be accommodated by standard single sign-on authentication technologies. In step 406, the base station 104 can be programmed to grant the communication device 102 access to the service requested directly or indirectly by way of the hosting party.

Figure 6:
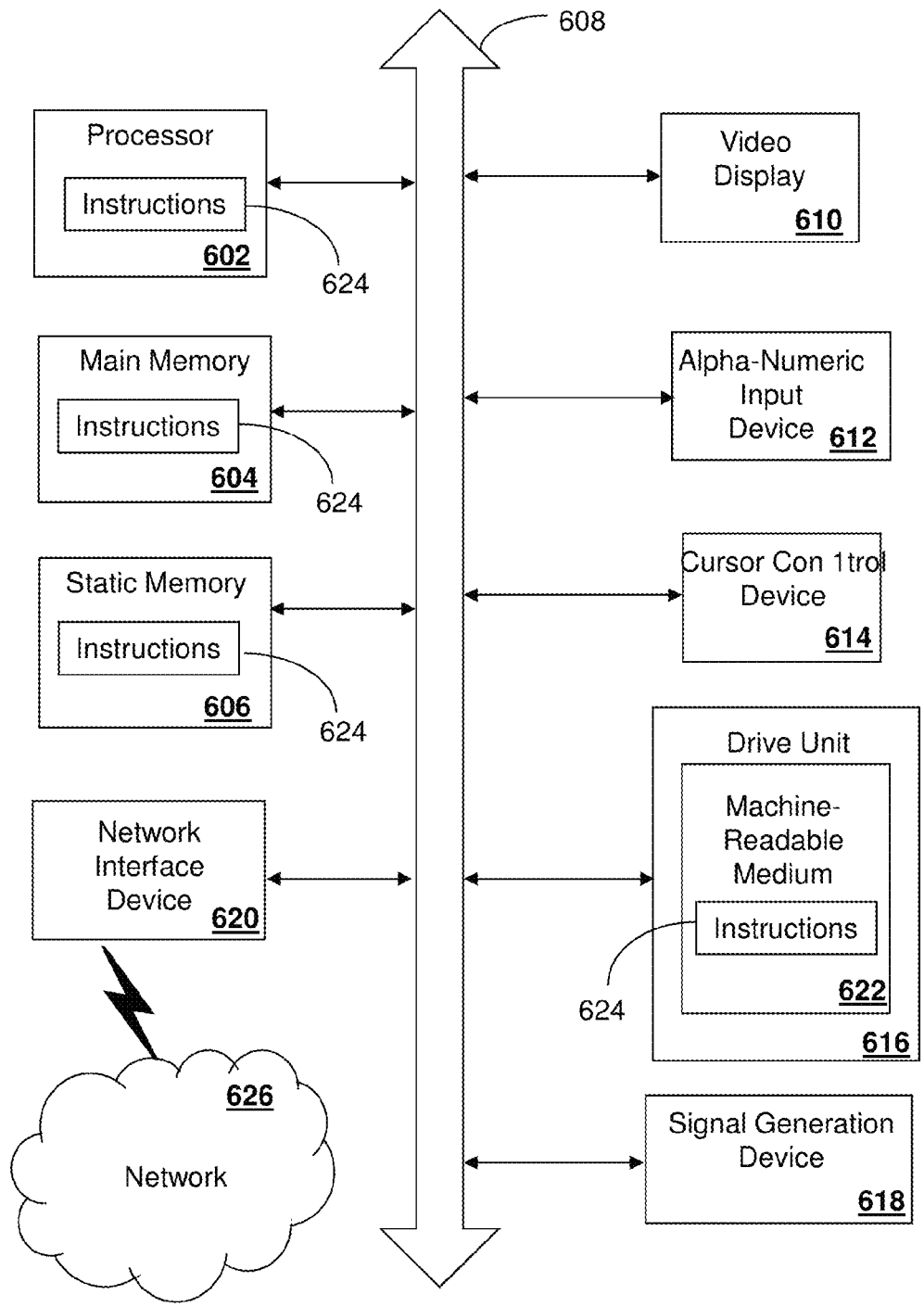
FIG. 6 depicts an exemplary diagrammatic representation of a machine in the form of a computer system within which a set of instructions, when executed, may cause the machine to perform any one or more of the methodologies disclosed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, but excludes carrier wave signals such as a signal embodying computer instructions in an intangible transmission medium.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   evaluating, by a device comprising a processor, a behavior of a user;
   detecting, by the device, a plurality of services operating in a television spectrum;
   identifying, by the device, for each service of the plurality of services a respective plurality of service attributes;
   establishing, by the device, a plurality of preferences of service attributes based on the evaluating of the behavior of the user, wherein the plurality of preferences of service attributes are selected from a group of service attributes comprising one of cost of service, quality of service, radio frequency signal strength of a base station, communication range of the base station relative to a location of the device, hand-off capabilities of neighboring base stations, or any combination thereof;
   generating, by the device, a group of user preferences of the plurality of preferences of service attributes according to a user profile;
   adjusting, by the device, first and second service attributes from the plurality of preferences of service attributes for each service of the plurality of services according to the group of user preferences to achieve a desired balance of service offerings;

identifying, by the device, available services operating in the television spectrum; and selecting, by the device, a service of the plurality of services in the television spectrum responsive to the adjusting of the first and second service attributes according to the group of user preferences.

2. The method of claim 1, wherein the selecting of the service further comprises selecting the service responsive to the adjusting according to a data rate to cost of service ratio determined for each service of the plurality of services in the television spectrum.

3. The method of claim 1, further comprising:

scanning, by the device, for services in a spectrum selected from a group of spectra comprising one of a cellular spectrum, an ultra-wideband spectrum, a wireless fidelity spectrum, a worldwide interoperability for microwave access spectrum, or any combination thereof.

4. The method of claim 1, wherein the identifying of the available services comprises scanning, by the device, the television spectrum for services according to a preference selected from a group of preferences comprising one of a cost of service, a quality of service, a radio frequency signal strength of a base station, a communication range of the base station, hand-off capabilities of neighboring base stations, or any combinations thereof.

5. The method of claim 1, further comprising:

receiving, by the device, control channel information indicating available services in the television spectrum, wherein the identifying of the available services comprises scanning the television spectrum for services in the television spectrum according to the control channel information.

6. The method of claim 1, further comprising:

establishing, by the device, a communication identifier list of other communication devices;

detecting, by the device, a presence of one of the other communication devices operating in the television spectrum; and facilitating, by the device, establishment of communications with the one of the other communication devices according to an entry in the communication identifier list.

7. The method of claim 1, comprising preventing, by the device, other communication devices operating in the television spectrum from detecting a presence of the device.

8. The method of claim 1, wherein the device is a portable communication device.

9. A device, comprising:

a memory to store instructions; and a processor coupled to the memory, wherein responsive to execution of the instructions, the processor facilitates performance of operations comprising:

evaluating a behavior of a user;

detecting a plurality of services operating in a television spectrum;

identifying for each service of the plurality of services a respective plurality of service attributes;

establishing a plurality of preferences of service attributes based on the evaluating of the behavior of the user, wherein the plurality of preferences of service attributes are selected from a group of service attributes comprising one of cost of service, quality of service, radio frequency signal strength of a base station, communication range of the base station relative to a location of the device, hand-off capabilities of neighboring base stations, or any combination thereof;

generating a group of user preferences of the plurality of preferences of service attributes according to a user profile;

adjusting first and second service attributes from the plurality of preferences of service attributes for each service of the plurality of services according to the group of user preferences to achieve a desired balance of service offerings;

identifying, by the device, available services operating in the television spectrum; and selecting one of the plurality of services according to a service preference responsive to the adjusting of the first and second service attributes according to the group of user preferences.

10. The device of claim 9, wherein the service preference is based on a comparison between a quality of service offering and cost of service offering of a communication network operating in the television spectrum.

11. The device of claim 9, wherein the operations further comprise:

receiving control channel information indicating available services operating in the television spectrum, and wherein the identifying of the available services comprises scanning for services operating in the television spectrum according to the control channel information.

12. The device of claim 9, wherein the operations further comprise:

monitoring a use behavior of services by an end user; and identifying the service preference from the monitored use behavior, wherein the identifying of the available services comprises scanning for services operating in the television spectrum according to the service preference.

13. The device of claim 9, wherein the operations further comprise:

establishing a contact list of other devices;

detecting from the one of the plurality of services a presence of one of the other devices utilizing the one of the plurality of services; and facilitating establishment of communications with the one of the other devices according to an identifier in the contact list.

14. The device of claim 9, wherein the one of the plurality of services is one of a group of services comprising one of full-duplex voice service, a half-duplex voice service, a location service, a video service, a text messaging service, an instant messaging service, or any combination thereof.

15. The device of claim 9, wherein the device comprises a portable communication device.

16. The device of claim 9, wherein the identifying of the available services comprises scanning for services according to preferences selected from a group of service attributes comprising one of a cost of service, a quality of service, a radio frequency signal strength of a base station, a communication range of the base station, hand-off capabilities of neighboring base stations, or any combination thereof.

17. A machine-readable storage device, comprising machine-readable instructions that, responsive to being executed by a processor, cause the processor to facilitate performance of operations comprising:

determining a behavior of a user;

identifying for each service of a plurality of services that operate in a television spectrum, a respective plurality of service attributes;

establishing a plurality of preferences of service attributes based on the determining of the behavior of the user, wherein the plurality of preferences of service attributes are selected from a group of service attributes comprising one of cost of service, quality of service, radio frequency signal strength of a base station, communication range of the base station relative to a location of a communication device, hand-off capabilities of neighboring base stations, or any combination thereof;

generating a group of user preferences of the plurality of preferences of service attributes according to a user profile;

adjusting first and second service attributes from the plurality of preferences of service attributes for each service of the plurality of services according to the group of user preferences to achieve a desired balance of service offerings;

identifying, by the device, a plurality of available services operating in the television spectrum; and selecting one of the plurality of available services operating in the television spectrum as a selected service responsive to the adjusting of the first and second service attributes according to the group of user preferences.

18. The machine-readable storage device of claim 17, wherein a communication device receives a selection of a service of the available services operating in the television spectrum.

19. The machine-readable storage device of claim 18, wherein the communication device selects the service operating in the television spectrum according to a comparison between a quality of service offering and a cost of service offering of each service of the plurality of services.

20. The machine-readable storage device of claim 17, wherein the operations further comprise:

receiving from a user interface, a selection of a service in operating the television spectrum; and facilitating enablement of the selected service.

* * * * *